United States Patent
Jiang et al.

(10) Patent No.: US 8,501,057 B1
(45) Date of Patent: Aug. 6, 2013

(54) FREEZING ASSISTED FABRICATION OF NANO AND MICRO HOLLOW CUBIC METAL OXIDES

(75) Inventors: Xingmao Jiang, Albuquerque, NM (US); C. Jeffrey Brinker, Albuquerque, NM (US)

(73) Assignee: STC.UNM, Alberquerque, NM (US)

( * ) Notice: Subject to any disclaimer, the term of this patent is extended or adjusted under 35 U.S.C. 154(b) by 105 days.

(21) Appl. No.: 13/010,121

(22) Filed: Jan. 20, 2011

Related U.S. Application Data

(60) Provisional application No. 61/337,258, filed on Jan. 31, 2010.

(51) Int. Cl.
B29C 35/02 (2006.01)

(52) U.S. Cl.
USPC .......................................................... 264/28

(58) Field of Classification Search
USPC .......................................................... 264/28
See application file for complete search history.

(56) References Cited

U.S. PATENT DOCUMENTS
2011/0318249 A1 * 12/2011 Nakayama et al. ........... 423/325

FOREIGN PATENT DOCUMENTS
WO  WO 2010/103856  * 9/2010

* cited by examiner

*Primary Examiner* — Larry Thrower
(74) *Attorney, Agent, or Firm* — MH2 Technology Law Group, LLP

(57) ABSTRACT

Various embodiments provide materials and methods of forming hollow cubes. The hollow cubes can be formed to include a metal oxide shell layer encasing a cubic hollow space. In one embodiment, the hollow cubes can be formed from an emulsion having aqueous droplets with an interfacial layer encasing an aqueous core. By an exemplary freezing treatment, the aqueous droplets having a spherical shape can be transformed into ice components having a cubic shape. Metal oxide precursors can then be added to react with the encased cube-shaped ice core at the interface with the interfacial layer to form a sol-gel metal oxide shell layer. Hollow cubes can be formed by removing the cube-shaped ice core from the sol-gel metal oxide shell layer.

20 Claims, 2 Drawing Sheets

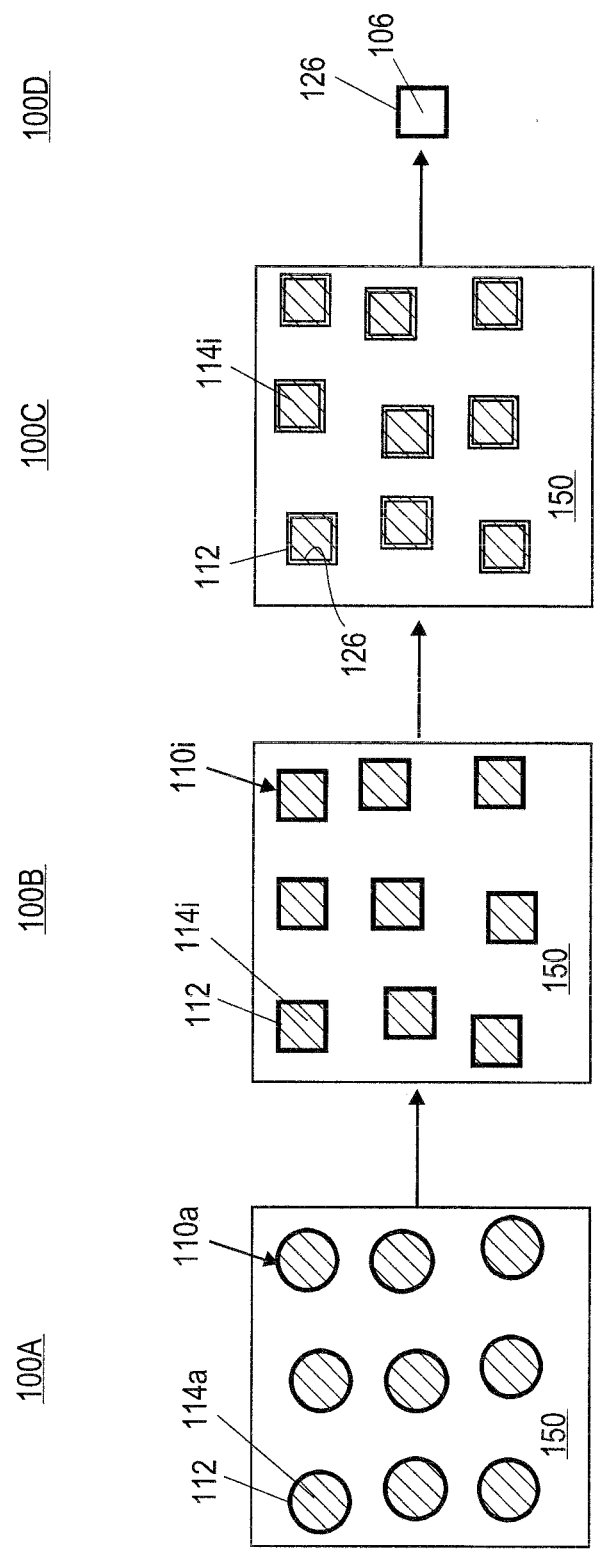

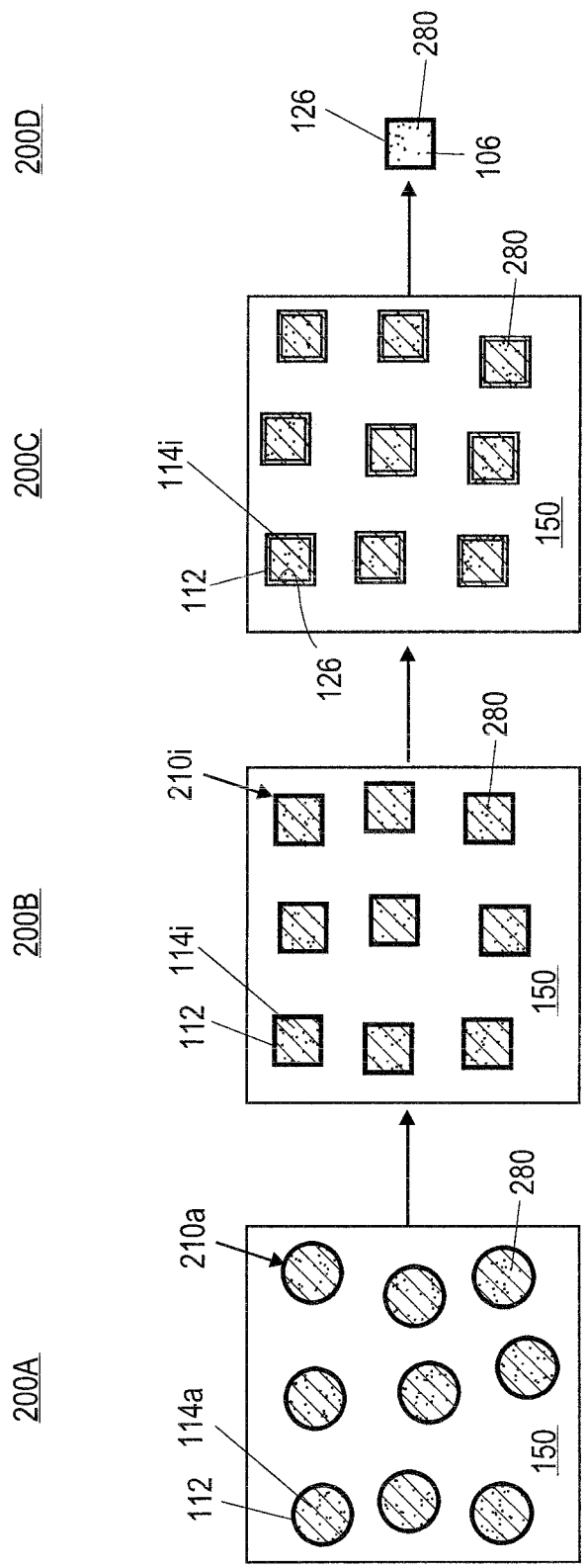

FREEZING ASSISTED FABRICATION OF NANO AND MICRO HOLLOW CUBIC METAL OXIDES

RELATED APPLICATIONS

This application claims priority to U.S. Provisional Patent Application Ser. No. 61/337,258, filed Jan. 31, 2010, which is hereby incorporated by reference in its entirety.

GOVERNMENT RIGHTS

This disclosure was made with Government support under Contract No. PHS 2 PN2 EY016570B awarded by the National Institute of Health (NIH). The U.S. Government has certain rights in the invention.

BACKGROUND

Nanometer and micrometer sized hollow cubic metal oxides have found increasing applications in meta-materials, wave scattering, microelectronics, wave absorption, drug delivery, nano-sized devices, lightweight composites, disinfection, sensing, and catalysis. These applications require hollow dense spherical metal oxides or hollow dense cubic metal oxides to be chemically and/or mechanically stable.

Conventional fabrication methods include steps of sacrificial templating (e.g., using expensive templates), spray freezing, and microemulsion formation. Such fabrication methods include a high cost, tedious synthesis of hollow metal oxides, which however, lack of a good control of monodispersity, integrity, and mechanical reliability of the hollow structures. Applications of the conventionally formed hollow structures are then limited. Other conventional fabrication methods involve sputtering, chemical vapor deposition, electroplating coatings, and molecular beam epitaxy growth. These methods require high vacuum, high energy, and long process time.

Thus, there is a need to overcome these and other problems of the prior art and to provide methods of fabricating hollow cubes that are energy efficient, reliable, low cost, template-free, and nondestructive.

SUMMARY

According to various embodiments, the present teachings include a method of forming a hollow cube. The hollow cube can be formed using an emulsion that includes an aqueous droplet dispersed in an oil phase. The aqueous droplet can include an interfacial layer encasing an aqueous core. The emulsion can then be subjected to a temperature to freeze the aqueous core into a cube-shaped ice core encased by the interfacial layer. This is followed by admixing a metal oxide precursor solution to react with the cube-shaped ice core at an interface with the interfacial layer to form a sol-gel metal oxide shell layer encasing the cube-shaped ice core. A hollow cube can then be formed by removing the cube-shaped ice core from the sol-gel metal oxide shell layer, wherein the hollow cube can have at least one inner side ranging from about 5 nm to about 100 µm in length.

According to various embodiments, the present teachings also include a method of forming a hollow cube using an emulsion. The emulsion can include a plurality of aqueous droplets dispersed in an oil phase, each aqueous droplet having an interfacial layer encasing an aqueous core. Each aqueous core can then be frozen to form a cube-shaped ice core encased by the interfacial layer. A metal oxide precursor solution can then be admixed to react with the cube-shaped ice core at an interface with the interfacial layer to form a sol-gel metal oxide shell layer. The cube-shaped ice core can be removed from the sol-gel metal oxide shell layer to form a hollow cube. The hollow cube can have a cubic hollow space with at least one side ranging from about 5 nm to about 100 µm in length.

According to various embodiments, the present teachings also include a method of forming a hollow cube. The formation can include an emulsion having a plurality of aqueous droplets in an oil phase, wherein each aqueous droplet can have an interfacial layer encasing an aqueous core. The aqueous core can be frozen into a cube-shaped ice core that is encased by the interfacial layer. One or more cargo components can be included in the aqueous core and remained in the cube-shaped ice core. A metal oxide precursor solution can be controllably admixing to react with the cube-shaped ice core at an interface with the interfacial layer to form a sol-gel metal oxide shell layer at a reaction temperature ranging from about −60° C. to about −5° C. This can be followed by removing the cube-shaped ice core to leave a plurality of hollow cubes each including a cubic hollow space loaded with one or more cargo components and encased by the sol-gel metal oxide shell layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

FIGS. 1A-1D depict a method of forming an exemplary hollow cube in accordance with various embodiments of the present teachings.

FIGS. 2A-2D depict a method of forming an exemplary hollow cube loaded with cargo components in accordance with various embodiments of the present teachings.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide materials and methods of forming hollow cubes. The hollow cubes can be formed to include a metal oxide shell layer encasing a cubic hollow space. The hollow cubes can be formed from an emulsion and/or a microemulsion. The emulsion/microemulsion can include a plurality of aqueous droplets disposed, uniformly or non-uniformly, within an oil phase, which can then be treated to form a plurality of ice components. For example, the aqueous droplets having a spherical shape can be transformed into the ice components having a cubic shape. By supplying metal oxide precursors into the emulsion containing the ice components, a metal oxide layer can be formed by sol-gel reactions of the metal oxide precursor(s) with the cube-shaped ice core encased within the ice components. The encased cube-shaped ice core can then be removed to form the hollow cube. In embodiments, the hollow cubes can be micro- and nano-sized.

FIGS. 1A-1D depict a method of forming an exemplary hollow cube in accordance with various embodiments of the present teachings.

As used herein, the term "emulsion" or "microemulsion" also refers to a solution that contains an aqueous phase dispersed in an oil phase or an oil phase dispersed in water. In some cases, the water or oil phase can be finely dispersed such that light passes through the microemulsion and the microemulsion may be opaque or clear in appearance. Emulsion/microemulsion compositions are known in the art, and are sometimes considered either as micellar solutions containing inverted micelles (hydrophobic tails oriented toward the external oil phase and hydrophilic heads in the inner core) with water (or the aqueous phase) solubilized in the inner core, or as emulsions containing tiny droplets of water (or the aqueous phase) surrounded by an interfacial film. See, e.g., Surfactants and Interfacial Phenomena, Milton J. Rosen, Page 239&240, John Wiley & Sons (1978).

FIG. 1A depicts an exemplary emulsion/microemulsion 100A in accordance with various embodiments of the present teachings.

As shown, the emulsion/microemulsion 100A can include a plurality of uniform aqueous droplets 110a with each droplet having an interfacial film 112 encasing an aqueous core 114a. The plurality of aqueous droplets 110a can be disposed, e.g., monodispersed, in an oil phase 150. In embodiments, the emulsion 100A can be a micellar solution, wherein the interfacial film 112 can include inverted micelles or a surfactant layer. The droplet size can be controlled by the temperature, surfactant type, and/or water/surfactant ratio.

For example, the interfacial layer 112 can include one or more low melting-point amphiphilic organic molecules including, but not limited to propylamine, diisobutylamine, 2-ethyl-1-hexylamine, n-octylamine, dicyclohexylamine, 3-ethylaniline, N-methyldioctylamine, cyclooctylamine and N,N-dimethyloctylamine, and/or surfactants from C5 to C16 including, but not limited to, sodium dodecyl sulfate, cetyltrimethylammonium bromide, sodium dodecylbenzenesulfonate, sodium dioctyl sulfosuccinate salt. The oil phase 150 can include an organic non-polar solvent with low freezing point. The oil phase 150 can be, e.g., butane, hexane, pentane, cyclohexane, cyclopentane, chloroform, etc. In one embodiment, the emulsion 100A can be formed by mixing a surfactant, an oil phase, and water (or an aqueous solution containing cargo components such as enzyme, insulin, vaccine, protein, and herbicide, etc. as depicted in FIGS. 2A-2D).

The surfactants or the interfacial layer can be present in an amount ranging from about 0.01% to about 5% by weight of the total emulsion 100A. By controlling concentration of the surfactants during emulsion formation, the size/shape of the aqueous droplets 110a and/or the thickness of the interfacial layer 112 can be controlled.

As a result, the aqueous droplets 110a can have an average outer diameter in a scale ranging between several nanometers and several micrometers. The average outer diameter of the aqueous droplets 110a can range from about 5 nm to about 200 μm, such as about 20 nm, while the interfacial layer 112 can have a thickness ranging from about 1 nm to about 20 nm, such as about 2 nm. The aqueous droplets 110a in the oil phase 150 can have a droplet density ranging from about 0.9 g/cm$^3$ to about 1.1 g/cm$^3$, such as about 1.0 g/cm$^3$. The aqueous droplets 110a can have a spherical shape.

In FIG. 1B, the emulsion 100A of FIG. 1A can be treated so that the aqueous core 114a freezes inside the interfacial layer 112 of the aqueous droplets 110a. The freezing treatment can be performed at a temperature of about 0° C. or less, e.g., ranging from about −60° C. to about −5° C., depending on the size, density, and/or other factors of the aqueous droplets 110a in the emulsion 100A. Due to this freezing treatment, the aqueous droplets 110a can transform their shape from spherical into cubic, forming cubic ice components 110i, as illustrated in FIG. 1B. Cubic ice components 110i can have a dimension that is in the nano-scale and/or the micro-scale depending on the emulsion 100A provided in FIG. 1A. For example, the ice components 110i can include nanocubes having a side length of about 1000 nm or less, or about 500 nm or less, or about 1 nm to about 100 nm. Note that the oil phase 150 in FIGS. 1A-1B can remain fluidic, regardless of the freezing treatment.

Following the formation of the cubic ice components 110i, a precursor solution, containing a metal oxide precursor or a combination of metal oxide precursors can be mixed with the suspension 100B to form a sol-gel reactant mixture. The precursor solution can be water-free. In some embodiments, the precursor solution can further include a non-polar low melting-point organic solvent including, hexane, butane, pentane, cyclohexane, cyclopentane, chloroform, etc. The organic solvent for the precursor solution can be the same or different from the oil phase 150.

The metal oxide precursor can include an oxide precursor of, e.g., silicon, iron, aluminum, niobium, tantalum, titanium, zirconium, cerium, tin, germanium, zinc, cadmium, lead, mercury, etc. A metal oxide shell layer can then be formed by a sol-gel process of the metal oxide precursor(s) in a controlled manner. The metal oxide shell can also be referred to herein as a sol-gel metal oxide layer. For illustrative purposes, the description herein primarily relates to the preparation of an exemplary metal oxide shell layer of silicon oxide.

In a sol-gel process to form an exemplary silicon oxide, a suitable precursor, such as, for example, tetraethyl orthosilicate (TEOS), tetramethyl orthosilicate (TMOS), and/or a combination of precursors can be hydrolyzed and further condensed to generate a solid state polymeric silicon-oxygen network. The sol-gel process can therefore include the stages or steps of hydrolysis, condensation, gelation (i.e., polymerization) and mass transport/removal of water and alcohol.

For example, the gelation or polymerization stage of the sol-gel process can be a two-step reaction including hydrolysis of the exemplary TEOS precursor followed by condensation of the hydrolyzed precursor. The initiation of the polymerization reaction is typically performed via a hydrolysis of alkoxide groups to form hydroxylated —Si—OH groups. Propagation then occurs by the condensation of these hydroxylated species giving rise to silane-oxygen polymers. The condensation can lead to the formation of OSiO bridges and the removal of other species such as water and alcohol. In embodiments, the OSiO bridges or the silicon-oxygen network can be two-dimensional or three-dimensional.

In embodiments, the precursor solution, e.g., including silicon oxide precursor such as TEOS and optionally an organic solvent of hexane, can be controllably admixed with the emulsion 100B to form the sol-gel reactant mixture. The sol-gel reaction can be controlled by the mixing conditions, e.g., by slowly adding the precursor solution to the emulsion 100B in a manner of, e.g., drop by drop, and/or by controlling the reaction temperature/time. The sol-gel reactant mixture can be formed and reacted at a temperature ranging from about −60° C. to about −5° C. for a time length ranging from about 10 minutes to 20 hours. As shown in FIG. 1C, the sol-gel reaction can occur at the interface of the cube-shaped ice core 114i and the interfacial layer 112, after the metal oxide precursor has diffused through the interfacial layer 112. As a result, a sol-gel metal oxide layer 126 can be formed at the interface of the cube-shaped ice core 114i with the interfacial layer 112.

Following the sol-gel formation of the metal oxide shell layer, the cube-shaped ice core 114i and/or the interfacial layer 112 can be removed, e.g., by evaporation, azeotropic distillation, or drying such as a vacuum drying, at a temperature of about 0° C. or greater, e.g., ranging from about 25° C. to about 75° C. or ranging from about 0° C. to about 50° C., such as about 25° C., for a time length of about 30 minutes or about 300 minutes. In embodiments, the removal of cube-shaped ice core 114i from the cubic ice components 110i can be performed in presence of different gases, such as, for example, in a $N_2$ atmosphere, air, $H_2/N_2$ mixed atmosphere, etc. In embodiments, the remaining interfacial layer 112 including such as surfactant or organic molecule can be removed by washing, extraction or low temperature oxidation, etc.

In FIG. 1D, hollow cubes 100D can be formed each having a cubic hollow space 106 encased by the metal oxide shell layer 126. The metal oxide shell layer 126 can be formed having a controllable thickness ranging from about 5 nm to about 200 nm, or from about 5 nm to about 100 nm, such as about 50 nm. The cubic hollow space 106 can have at least one side length ranging from about 5 nm to about 200 μm, or from about 5 nm to about 100 μm, such as about 100 nm. In embodiments, highly monodispersed cubic nano metal oxides of uniform shell thickness can be formed. In embodiments, the metal oxide shell layer 126 can be formed to have a low dielectric constant or high quality optical properties. For example, the metal oxide shell layer 126 can have a low refractive index, e.g., ranging from about 1.4 to about 2.7.

In embodiments, the formed metal oxide shell can be further reduced into a metal shell forming hollow cubic metals. The hollow cubic metals can be converted into, for example, hollow cubic Au, Ag, Pt, Pd, etc. by single replacement reactions for sensing, catalysis, metamaterials, etc.

As compared with conventional methods of forming hollow cubes, the methods disclosed herein can provide highly monodispersed hollow cubes (e.g., in nano-scale) with high production yield and low cost. Additionally, milder preparation conditions can be used as compared with conventional methods that require processes of calcination and/or chemical etching. Further, precise control of size and shell thickness can be provided using the disclosed methods as depicted in FIGS. 1A-1D.

The formed hollow cubes and their methods can be used in applications including, but not limited to, meta-materials, drug delivery, biomedical diagnostics, imaging, disease treatment, anti-bacteria applications, sensors, microelectronics, wave scattering, wave absorption, lightweight composites, disinfection, and/or catalysis. For example, the disclosed materials and methods can be incorporated with various heat sensitive components, such as enzymes, proteins, nucleic acids, and/or vaccines to form encapsulates having the heat sensitive components protected and encapsulated in the exemplary monodisperse hollow cubic metal oxides.

In one embodiment, the methods depicted in FIGS. 1A-1D can be used to form hollow cubes loaded with various desired species, which are also referred to herein as "cargos" or "cargo components". As used herein, the term "cargos" or "cargo components" refers to components including, but not limited to, chemical and/or biochemical molecules including salts, nucleic acids, vaccines, etc., nanoparticles including quantum dots, etc., and/or therapeutic drug/agents.

FIGS. 2A-2D depict a method of forming a hollow cube containing cargo components in accordance with various embodiments of the present teachings. As compared with the method depicted in FIGS. 1A-1D, cargo components can be added within the aqueous core 114a of the aqueous droplets 110a and therefore within the cube-shaped ice core 114i of the ice droplet 110i. For example, FIG. 2A depicts an exemplary emulsion 200A containing a plurality of aqueous droplets 210a dispersed within an oil phase 150. The aqueous droplets 210a can include an interfacial layer 112 encasing an aqueous core 114a, wherein one or more cargo components 280 can be disposed within the aqueous core 114a encased by the interfacial layer 112. The cargo components 280 can have a concentration ranging from about 5% to about 80% by weight of the total aqueous droplet 210a.

In FIG. 2B, the aqueous droplets 210a can then be frozen to form a plurality of ice components 210i having the cargo components 280 dispersed in a cube-shaped ice core 114i that remain encased by the interfacial layer 112, as similarly described in FIG. 1B.

In FIG. 2C, a precursor solution, as depicted in FIG. 1C, can be controllably mixed (e.g., admixed in drops), with the emulsion 200B during or after freezing for a sol-gel process to form a metal oxide shell layer 126 at the interface of the cube-shaped ice core 114i with the interfacial layer 112. Cargo components 280 can remain dispersed within the cube-shaped ice core 114i. Because the formation of emulsion 200A, the freezing treatment in FIG. 2B, and/or the sol-gel process in FIG. 2C can be performed at low temperatures as similarly described in FIGS. 1A-1C, the cargo components 280, e.g., the heat sensitive components, can remain intact and protected within the interfacial layer 112 of 200A-C.

In FIG. 2D, cube-shaped ice cores 114i can be removed from the metal oxide shell layer 126, e.g., by evaporation at the room temperature or a lower, or by a vacuum drying at low temperatures. Hollow cubes 200D having cargo components 280 loaded within a hollow space 106 encased by the metal oxide shell layer 126 can then be formed. In embodiments, the low temperatures used for forming the hollow cubes in FIGS. 2A-2D can range between −60° C. and −5° C., due to the incorporation of, e.g., heat sensitive cargo components, with the fabrication of hollow cubes.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a hollow cube comprising:
    providing an emulsion comprising an aqueous droplet dispersed in an oil phase, wherein the aqueous droplet comprises an interfacial layer encasing an aqueous core;
    subjecting the emulsion to a temperature to freeze the aqueous core into a cube-shaped ice core encased by the interfacial layer;
    admixing a metal oxide precursor solution to react with the cube-shaped ice core at an interface with the interfacial layer to form a sol-gel metal oxide shell layer encasing the cube-shaped ice core; and
    forming a hollow cube by removing the cube-shaped ice core from the sol-gel metal oxide shell layer, wherein the hollow cube comprises a cubic hollow space having at least one side ranging from about 5 nm to about 100 μm in length.

2. The method of claim 1, further comprising simultaneously forming a plurality of hollow cubes with the formation of the hollow cube, wherein the emulsion is provided having an aqueous droplet density in the oil phase ranging from about 0.9 g/cm$^3$ to about 1.1 g/cm$^3$.

3. The method of claim 1, further comprising subjecting the emulsion to a temperature ranging from about −60° C. to about −5° C.

4. The method of claim 1, wherein the step of admixing a metal oxide precursor solution further comprises controllably adding the metal oxide precursor solution in a drop by drop manner.

5. The method of claim 1, wherein the sol-gel metal oxide shell layer is formed by a sol-gel reaction at a temperature ranging from about −60° C. to about −5° C.

6. The method of claim 1, wherein the cube-shaped ice core is removed by evaporation at a temperature of about 0° C. or greater.

7. The method of claim 1, further comprising removing the interfacial layer after the formation of the sol-gel metal oxide shell layer.

8. The method of claim 1, wherein the interfacial layer is present in the provided emulsion in an amount ranging from about 0.01% to about 5% by weight of the total emulsion.

9. The method of claim 1, wherein the interfacial layer comprises one or more low melting-point amphiphilic organic molecules that comprise organic amines and ionic surfactants.

10. The method of claim 1, wherein the oil phase comprises hexane, butane, pentane, cyclohexane, cyclopentane, chloroform, and a combination thereof.

11. The method of claim 1, wherein the aqueous droplet has an average outer diameter ranging from about 5 nm to about 200 μm, and the interfacial layer has an average thickness ranging from about 1 nm to about 10 nm.

12. The method of claim 1, wherein the metal oxide precursor solution further comprises an organic solvent comprising hexane, butane, pentane, cyclohexane, cyclopentane, chloroform, and a combination thereof.

13. The method of claim 1, wherein the sol-gel metal oxide shell layer is formed to have an average shell thickness ranging from about 5 nm to about 200 nm.

14. The method of claim 1, wherein the sol-gel metal oxide shell layer has a refractive index ranging from about 1.4 to about 2.7.

15. The method of claim 1, wherein the metal oxide precursor solution comprises an oxide precursor of a metal selected from silicon, iron, aluminum, niobium, tantalum, titanium, zirconium, cerium, tin, germanium, zinc, cadmium, lead, mercury, and a combination thereof.

16. The method of claim 1, further comprising reducing the sol-gel metal oxide shell layer to form a metal shell encasing the cubic hollow space.

17. A method of forming a hollow cube comprising:
    providing an emulsion comprising an aqueous droplet dispersed in an oil phase, wherein the aqueous droplet comprises an interfacial layer encasing an aqueous core;
    subjecting the emulsion to a temperature to freeze the aqueous core into a cube-shaped ice core encased by the interfacial layer;
    admixing a metal oxide precursor to react with the cube-shaped ice core at an interface with the interfacial layer to form a metal oxide shell layer encasing the cube-shaped ice core; and
    forming a hollow cube by removing the cube-shaped ice core from the metal oxide shell layer, wherein the hollow cube comprises a cubic hollow space.

18. The method of claim 17, wherein the interfacial layer comprises a surfactant.

19. The method of claim 17, wherein the oil phase remains a fluid when the aqueous core freezes.

20. The method of claim 17, wherein the precursor comprises a water reactive metal that reacts only at the interfacial layer.

* * * * *